United States Patent

Tabuchi

(10) Patent No.: US 8,285,896 B2
(45) Date of Patent: Oct. 9, 2012

(54) DATA CONVERSION SYSTEM

(75) Inventor: Atsushi Tabuchi, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 46 days.

(21) Appl. No.: 10/595,168

(22) PCT Filed: Sep. 19, 2003

(86) PCT No.: PCT/JP03/11949
§ 371 (c)(1),
(2), (4) Date: Mar. 16, 2006

(87) PCT Pub. No.: WO2005/029853
PCT Pub. Date: Mar. 31, 2005

(65) Prior Publication Data
US 2007/0046512 A1  Mar. 1, 2007

(51) Int. Cl.
*G06F 13/14* (2006.01)
*G06F 1/12* (2006.01)
(52) U.S. Cl. .......................... 710/61; 713/400
(58) Field of Classification Search .............. 710/61; 341/118
See application file for complete search history.

(56) References Cited

U.S. PATENT DOCUMENTS

| | | | | |
|---|---|---|---|---|
| 5,781,599 A * | 7/1998 | Shiga | ............................. | 375/376 |
| 6,128,318 A * | 10/2000 | Sato | ............................. | 370/503 |
| 6,148,051 A | 11/2000 | Fujimori et al. | | |
| 6,300,985 B1 * | 10/2001 | Lowe et al. | ................... | 348/665 |
| 6,757,304 B1 | 6/2004 | Nomura et al. | ................. | 370/516 |
| 6,895,009 B1 * | 5/2005 | Stallkamp | ........................ | 370/394 |
| 2001/0024455 A1 | 9/2001 | Thaler et al. | | |
| 2002/0049879 A1 * | 4/2002 | Eyer | ............................... | 710/305 |
| 2003/0014679 A1 * | 1/2003 | Domon | ........................... | 713/400 |

FOREIGN PATENT DOCUMENTS

| | | |
|---|---|---|
| EP | 0 721 288 A2 | 7/1996 |
| EP | 0 971 547 A2 | 1/2000 |
| EP | 1 156 628 A2 | 11/2001 |
| JP | 2000/32391 A | 1/2000 |
| JP | 2000-216800 A | 8/2000 |
| JP | 2000/278644 A | 10/2000 |
| JP | 2002/271773 A | 9/2002 |
| KR | 2001-0005650 | 1/2001 |
| WO | WO 01/78408 A2 | 10/2001 |

* cited by examiner

*Primary Examiner* — Henry Tsai
*Assistant Examiner* — Titus Wong
(74) *Attorney, Agent, or Firm* — Arent Fox LLP

(57) ABSTRACT

A data conversion system for converting data outputted from an information processor into data in a different format in real time while preventing any defect of an image such as frame missing or frame repetition of moving image data by synchronizing data transfer with converted data output. One of first and second nodes on an IEEE1394 bus functions as a cycle master, and first data is transferred from the first node to the second node in synchronism with a cycle start packet outputted from the cycle master. Second data generated by converting the first data by the second node is outputted in synchronism with a reference signal inputted from outside. The system comprises an external synchronizing signal receiving section provided at least in one of the first and second nodes and adapted to receive the reference signal inputted from outside and a synchronism control section for synchronizing the frequency of a cycle start packet outputted from the cycle master with the reference signal received by the external synchronizing signal receiving section.

13 Claims, 3 Drawing Sheets

DATA CONVERSION SYSTEM

TECHNICAL FIELD

The present invention relates to a data conversion system for real time conversion of data output from an information processor into data in a different format; more specifically, it relates to a data conversion system configured so that one of first and second nodes on an IEEE1394 bus serves as cycle master, first data is transferred from the first node to the second node in synchronism with a cycle start packet output from the cycle master, and second data generated by conversion of the first data by the second node is output in synchronism with an external reference signal.

BACKGROUND ART

Due to remarkable improvements in the data recording capacity and processing speed of personal computers (PC), so-called nonlinear editing for performing video editing on a PC is becoming increasingly popular. For capturing video materials to a PC and outputting edited video images, dedicated hardware such as a video capture board, video editing board or the like is additionally inserted in an expansion slot, and data is input/output via such hardware.

Even today, handling analog video and high-end professional signals requires dedicated hardware. However, to handle just data in the DV (digital video) format, which is widely used for consumer devices and low-end professional use, even general inexpensive hardware meeting the standards for a 1394OHCI compliant IEEE1394 interface is sufficient for practical use.

This is because improvements in the CPU capacity of PCs have allowed the practical execution of such processing as video editing without having to use dedicated hardware, and an 1394OHCI compliant IEEE1394 interface is now supported as an interface for a typical video editing software for input/output of data in DV format.

A 1394OHCI compliant IEEE1394 interface is frequently standard not only on desktop PCs but also on notebook PCs, enabling a single notebook PC to be used for everything from inputting/outputting to editing videos in DV format.

If only video material in DV format is to be handled, the process can be completed using a system as described above; however, there are many cases in which analog video images and material in SDI format for professional use need to be handled, and such cases require mutual conversion of formats. To perform mutual data conversion between video material in DV format and analog video images or video material in SDI format, an external unit type DV converter is often concurrently used, such converter converting an input analog video signal or SDI video signal to a DV format in real time and outputting the same as a DV signal, or conversely, converting a video signal in DV format to an analog video signal or SDI video signal and outputting the same.

There are various DV converters, ranging from those for consumer use to those for professional use. Professional use DV converters may require a function called external synchronization (genlock). With DV converters having no such external synchronization function, when a DV signal output from a PC via a 1394OHCI compliant IEEE1394 interface is converted into an analog video signal or SDI video signal, the converted analog video signal or SDI video signal is output at a timing in accordance with the frame frequency of the DV signal output from the PC.

With DV converters having an external synchronization function, a reference signal that serves as a reference for output timing is input via a reference input terminal. When a DV video signal output from a PC 1394OHCI compliant IEEE1394 interface is converted into an analog video signal or SDI video signal, the converted signal, while being buffered, is synchronized with the reference signal and output.

Data transmission between nodes connected on an IEEE1394 bus is either in an asynchronous transfer mode or isochronous transfer mode, and for video and audio transmission, isochronous transfer mode is used. This isochronous transfer mode is also used when a DV video signal is output via a PC 1394OHCI compliant IEEE1394 interface.

When a PC and DV converter exist on an IEEE1394 bus as nodes, and a DV video signal is to be output to the DV converter via a PC 1394OHCI compliant IEEE1394 interface, one of the PC and DV converter serves as a node called a cycle master for managing the transfer cycle, and cycle start packets are output to the IEEE1394 bus at a constant frequency (125 μsec).

The PC 1394OHCI compliant IEEE1394 interface transmits a video signal in DV format in an IEEE1394 defined isochronous transfer packet format each time a cycle start packet output from the cycle master is detected.

Thus, the frame frequency of the DV video signal output from a PC 1394OHCI compliant IEEE1394 interface is synchronized with the frequency of the cycle start packet output from the cycle master. The interval of 125 μsec between cycle start packets output from the cycle master is generated by frequency division at a set ratio from a 24.576 MHz clock source of the node serving as cycle master. Because of differences in clock source for different pieces of hardware, frequency varies. Therefore, because the frame frequency of a DV video signal output from a PC 1394OHCI compliant IEEE1394 interface differs depending on the device, a frame frequency on average will not match the frame frequency of an external reference signal input into a DV converter. As a result, even when buffering is performed at the DV converter, there are problems such as dropped frames in output analog signals or SDI signals in cases where the PC transfer speed is high, and repeated frames in output analog video signals or SDI video signals when the PC transfer speed is low.

The timing of the dropped frames or repeated frames is difficult to predict, and notwithstanding precise editing in frame units using video editing software loaded on a PC, there is the danger that defects such as dropped frames or repeated frames may irregularly occur in the images ultimately output.

The present invention provides a data conversion system configured so that when data output from an information processor is converted into data in a different format in real time, data transfer and converted data output are synchronized, thereby preventing the occurrence of defects in moving image data such as dropped frames or repeated frames.

DISCLOSURE OF THE INVENTION

The data conversion system according to a first aspect of the present invention is a data conversion system configured so that one of first and second nodes on an IEEE1394 bus serves as cycle master, first data is transferred from the first node to the second node in synchronism with a cycle start packet output from the cycle master, and second data generated by conversion of the first data by the second node is synchronized with an external reference signal and output, and comprises an external synchronizing signal receiver for receiving an external reference signal provided on at least one of the first and second nodes; and a synchronization adjustment unit for synchronizing the cycle start packet frequency output from the cycle master with the frequency of the reference signals received by the external synchronizing signal receiver.

With this configuration, by synchronization of the cycle start packet frequency with the reference signal, the transfer rate of the data output from the first node can be matched to the output rate of the second data from the second node, thereby preventing the occurrence of dropped frames or repeated frames or the like in the output second data. In particular, when a video signal in DV format is converted into a video signal in a different format, the occurrence of any image defect such as dropped frames or repeated frame or the like can be prevented.

The data conversion system according to a second aspect of the present invention is the data conversion system according to the first aspect, wherein the first node is hardware comprising a 1394OHCI compliant IEEE1394 interface for outputting a video signal in DV format as first data, and the second node is data conversion hardware for outputting an analog video signal or SDI video signal as second data.

With this configuration, the output of video signals in DV format is output at a frequency in synchronism with the reference signal, thereby preventing the occurrence of image defects such as dropped frames or repeated frames in an analog video signal or SDI video signal.

The data conversion system according to a third aspect of the present invention is the data conversion system according to the first aspect, wherein the second node has an external synchronizing signal receiver and synchronizing adjustment unit, and serves as cycle master for data transfer.

With this configuration, the transfer rate of data output from the first node can be synchronized with a reference signal received by the second node.

The data conversion system according to a fourth aspect of the present invention is a data conversion system according to the first aspect, wherein the first node has a synchronization adjustment unit, the second node has an external synchronizing signal receiver and synchronization adjustment unit, and the synchronization adjustment unit of the node serving as cycle master synchronizes the cycle start packet frequency with a reference signal received by the external synchronizing signal receiver.

With this configuration, whichever one of the first and second nodes serves as cycle master, data can be transferred in synchronism with the reference signal received by the external synchronizing signal receiver, thereby preventing occurrence of defects in data output from the second node.

The data conversion system according to a fifth aspect of the present invention is the data conversion system according to the fourth aspect, wherein when the first node serves as cycle master, the synchronizing adjustment signal generated in accordance with the reference signal received by the external synchronizing signal receiver of the second node is transmitted from the second node to the first node by asynchronous transfer of the IEEE1394 interface.

With this configuration, because a synchronizing adjustment signal generated in accordance with the reference signal received by the external synchronizing signal receiver is transmitted using the IEEE1394 bus, even when the first node serves as cycle master, a synchronizing adjustment signal can be transmitted without increasing wiring.

The data conversion system according to a sixth aspect of the present invention is a data conversion system according to the fourth aspect, comprising a dedicated synchronization signal line for transmitting, from the second node to the first node, the synchronizing adjustment signal generated in accordance with the reference signal received by the external synchronizing signal receiver of the second node, the transmission performed in situations in which the first node serves as cycle master.

With this configuration, even when the external synchronizing reference signal is input in the second node and the first node serves as cycle master, the data transfer rate of the first node can be reliably synchronized with the reference signal.

The data conversion system according to a seventh aspect of the present invention is the data conversion system according to the first aspect, wherein the first node has an external synchronizing signal receiver and synchronization adjustment unit, and serves as cycle master for data transfer.

With this configuration, because the frame frequency of data output from the first node is already fully externally synchronized, the second node only needs to perform conversion, enabling external synchronization so that the system overall does not have drop frame or repeated frame, even when the second mode is a DV converter with no external synchronization function.

PREFERRED EMBODIMENTS OF THE INVENTION

In the present invention, a situation will be considered in which hardware (a PC) comprising a 1394OHCI compliant IEEE1394 interface, and conversion hardware ("DV converter") for converting a DV video signal output from the PC into an analog signal or SDI video signal and outputting the same, are connected as nodes on an IEEE 1394 bus. The video signal in DV format output from the PC 1394OHCI compliant IEEE1394 interface is transferred in an isochronous transfer mode to the DV converter that serves as a second node.

The isochronous transfer mode is managed by a node called a cycle master on the IEEE1394 bus, and in accordance with the cycle start packet that the cycle master outputs every 125 μsec, a video signal in DV format is output from the PC 1394OHCI compliant IEEE1394 interface.

Because the interval between cycle start packets is determined by frequency division at a set ratio from a 24.576 MHz clock source of the cycle master, and does not match the interval between reference signals input in an external synchronizing circuit, when an analog video signal or SDI video signal converted by the DV converter is output, defects arise such as dropped frames or repeated frames even if buffering is performed. Therefore, in the present invention, feedback control of the clock source frequency of the cycle master is carried out using the reference signal, causing the interval between cycle start packets output from the cycle master to be longer or shorter than 125 μsec, and thereby dynamically changing the transfer rate of the IEEE1394, so that the average frame frequency of the video signal in DV format output from the 1394OHCI compliant IEEE1394 interface matches the frequency of the external synchronizing reference signal.

Hereinafter, the present invention will be explained with specific embodiments.

First Embodiment

The first embodiment of the present invention will be explained with reference to FIG. 1.

Figure 1:
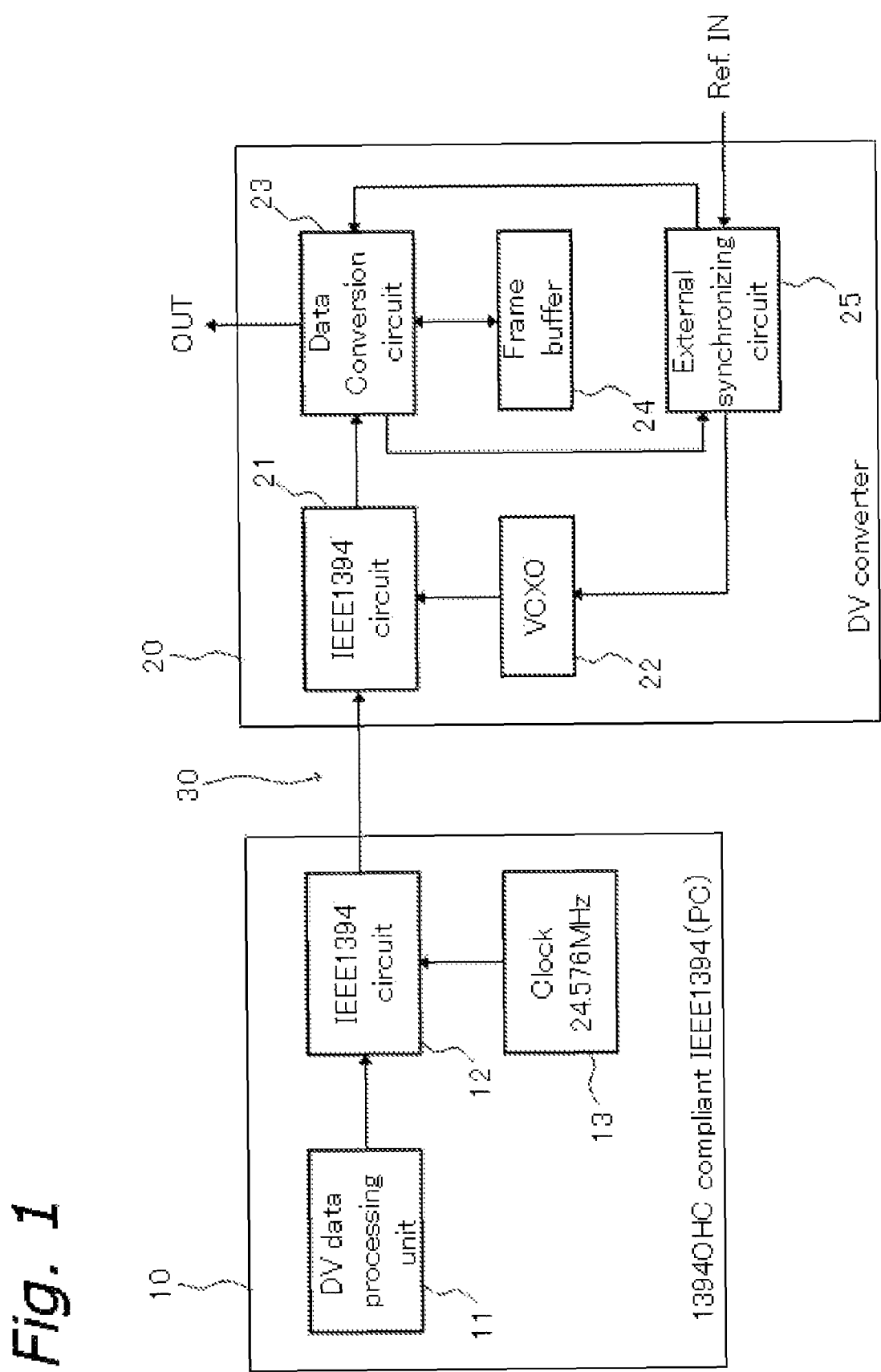
FIG. 1 is a simplified block diagram of the first embodiment.

In FIG. 1, a PC 10 as 1394OHCI compliant IEEE1394 hardware, and a DV converter 20 for converting a video signal in DV format into an analog video signal or SDI video signal, are connected by an IEEE1394 cable 30.

The PC 10 comprises a DV data processing unit 11 containing a hard disk or other recording medium for storing moving image data in DV format, an IEEE1394 circuit 12 for inputting/outputting data in an IEEE1394-defined packet format, and a clock source 13 constituted by a crystal oscillator or the like. The PC 10 contains a CPU, ROM, RAM, and other interfaces, but these functional parts are omitted in the drawing. The environment of the PC 10 allows for execution of a video editing software for editing at least data in DV format, and output can be made via the DV data processing unit 11 and IEEE1394 circuit 12.

The DV converter 20 comprises an IEEE1394 circuit 21 for receiving a video signal in DV format transferred via the IEEE1394 cable 30, a data conversion circuit 23 for converting the transferred video signal in DV format into an analog video signal or SDI video signal, a frame buffer 24 for temporally buffering the converted video signal, an external synchronizing circuit 25 for receiving an external reference signal, and a clock oscillator circuit VCXO (Voltage Controlled Crystal Oscillator) 22 subject to voltage feedback control by the external synchronizing circuit 25. This DV converter 20 also contains a CPU, ROM, RAM, and various interfaces, which are omitted in the drawing.

In the first embodiment thus configured, the IEEE1394 node constituted by the DV converter 20 serves as a cycle master. The IEEE1394 circuit 21 of the DV converter 20 serving as the cycle master outputs a cycle start packet each 125 μsec to the IEEE1394 bus, and the clock oscillator circuit for determining intervals between cycle start packets is controlled by the external synchronizing circuit 25.

The external synchronizing circuit 25 performs feedback control of VCXO 22 voltage to control VCXO 22 oscillation frequency so as to maintain a constant timing differential between the input reference signal and output analog video signal or SDI video signal. With this configuration, the cycle start packet output interval generated by frequency division at a set rate of the VCXO 22 clock changes, and the transfer rate from the 1394OHCI compliant IEEE1394 PC 10 determined by the cycle start packet interval is synchronized with the reference signal.

With this configuration, the DV converter 20 receives transfer of a DV video signal from the PC 10 1394OHCI compliant IEEE1394 interface and completely synchronizes the data-converted analog video signal or SDI video signal with the reference signal and outputs the same in a state with no defects such as dropped frames or repeated frames.

With the first embodiment, a standard product can be used as the IEEE1394 hardware PC 10.

Second Embodiment

There are cases where it is not specified whether or not the IEEE1394 circuit in a PC connected to an IEEE1394 bus or the IEEE1394 circuit in a DV converter connected to the IEEE1394 is to serve as a cycle master. When the DV converter does not serve as a cycle master, the PC IEEE1394 node serves as cycle master, and thus the PC clock oscillation frequency needs to be controlled so as to be synchronized with the reference signal. An explanation will be given with reference to FIG. 2 of such a case as a second embodiment of the present invention.

Figure 2:
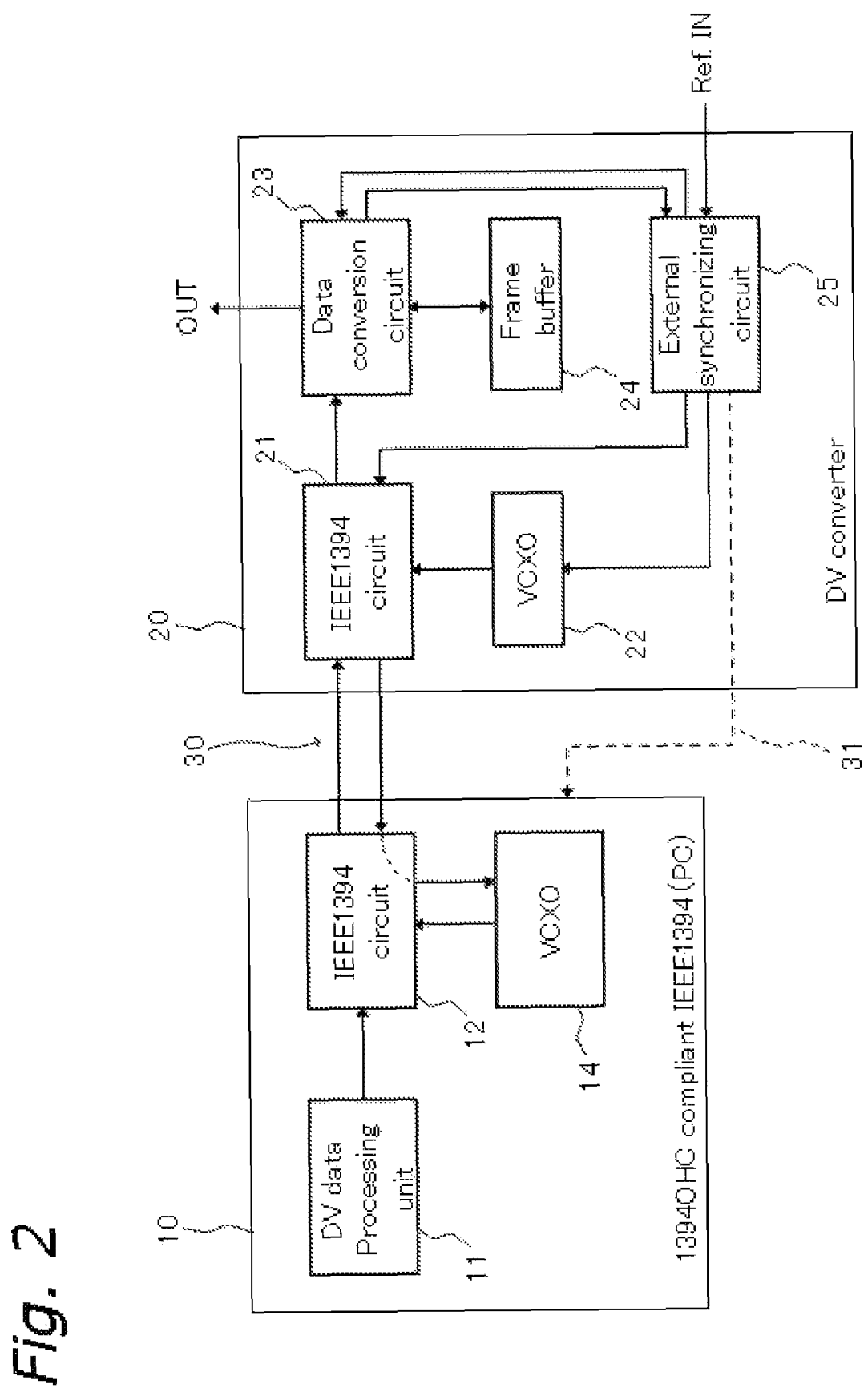
FIG. 2 is a simplified block diagram of the second embodiment.

In FIG. 2, the PC 10 serving as 1394OHCI compliant IEEE1394 hardware and the DV converter 20 for converting a video signal in DV format into an analog video signal or SDI video signal are connected by the IEEE1394 cable 30.

The PC 10 comprises the DV data processing unit 11 containing a hard disk or other recording medium for storing moving image data in DV format, the IEEE1394 circuit 12 for inputting/outputting data in an IEEE-defined format, and the VCXO 14 subject to oscillation frequency control by voltage feedback. As with the above, the PC 10 contains a CPU, ROM, RAM, and other interfaces, but these functional parts are omitted in the drawing. Further, the PC 10 environment allows execution of a video editing software for editing at least data in DV format, and output is made via the DV data processing unit 11 and IEEE1394 circuit 12.

The DV converter 20 comprises the IEEE1394 circuit 21 for receiving a video signal in DV format transferred via the IEEE1394 cable 30, the data conversion circuit 23 for converting the transferred video signal in DV format into a video signal in an analog format or a video signal in an SDI format, the frame buffer 24 for temporally buffering the converted video signal, the external synchronizing circuit 25 for receiving the external reference signal, and the clock oscillator circuit VCXO 22 subject to voltage feedback control by the external synchronizing circuit 25. This DV converter 20 also comprises a CPU, ROM, RAM, and various interfaces, but these functional parts are omitted in the drawing.

With the second embodiment thus configured, when the IEEE1394 node that is the DV converter 20 serves as cycle master, as in the first embodiment, the external synchronizing circuit 25 performs feedback control of VCXO 22 voltage to control VCXO 22 oscillation frequency so as to maintain a constant timing differential between the input reference signal and output analog video signal or SDI video signal. With this configuration, the cycle start packet output interval generated by frequency division of the VCXO 22 clock at a set rate changes, and the transfer rate from the 1394OHCI compliant IEEE1394 PC 10 determined by the cycle start packet interval is synchronized with the reference signal.

Further, when the IEEE1394 node that is the PC 10 serves as cycle master, the reference signal received by the external synchronizing circuit 25 of the DV converter is transmitted to the PC 10 via the IEEE1394 cable 30, and feedback control of the VCXO 14 in the PC 10 is performed so as to maintain a constant timing differential between the reference signal and cycle start packet. The reference signal can be transferred from the DV converter 20 to the PC 10 in an asynchronous transfer mode, and in such a case, the PC 10 requires an algorithm or the like for interpreting commands transmitted to the PC 10 by an AV/C protocol. With this configuration, the output interval between cycle start packets created by frequency division at a set rate of the VCXO 14 clock changes, and the transfer rate from the 1394OHCI compliant IEEE1394 PC 10 determined by the cycle start packet interval is also synchronized with the reference signal.

Thus, with the second embodiment, whether the PC 10 or DV converter 20 serves as cycle master, a data-converted analog video signal or SDI video signal is fully synchronized with the reference signal and output, in a state with no defects such as drop frame or repeated frame.

Modification

In an alternative configuration, there is provided a separate dedicated control signal line 31 for transmitting to the PC 10 a synchronizing adjustment signal created in accordance with the reference signal input in the external synchronizing circuit 25 of the DV converter 20. In this case, the synchronizing adjustment signal created in accordance with the reference signal is reliably transmitted by the dedicated control signal line 31, and the VCXO 14 in the PC 10 is subject to feedback control.

Third Embodiment

In an alternative configuration, a reference signal for external synchronization is input in a PC, and the transfer frequency from the PC to the DV converter is controlled so as to be synchronized with this reference signal. An explanation will be given with reference to FIG. 3 of such a case as a third embodiment.

Figure 3:
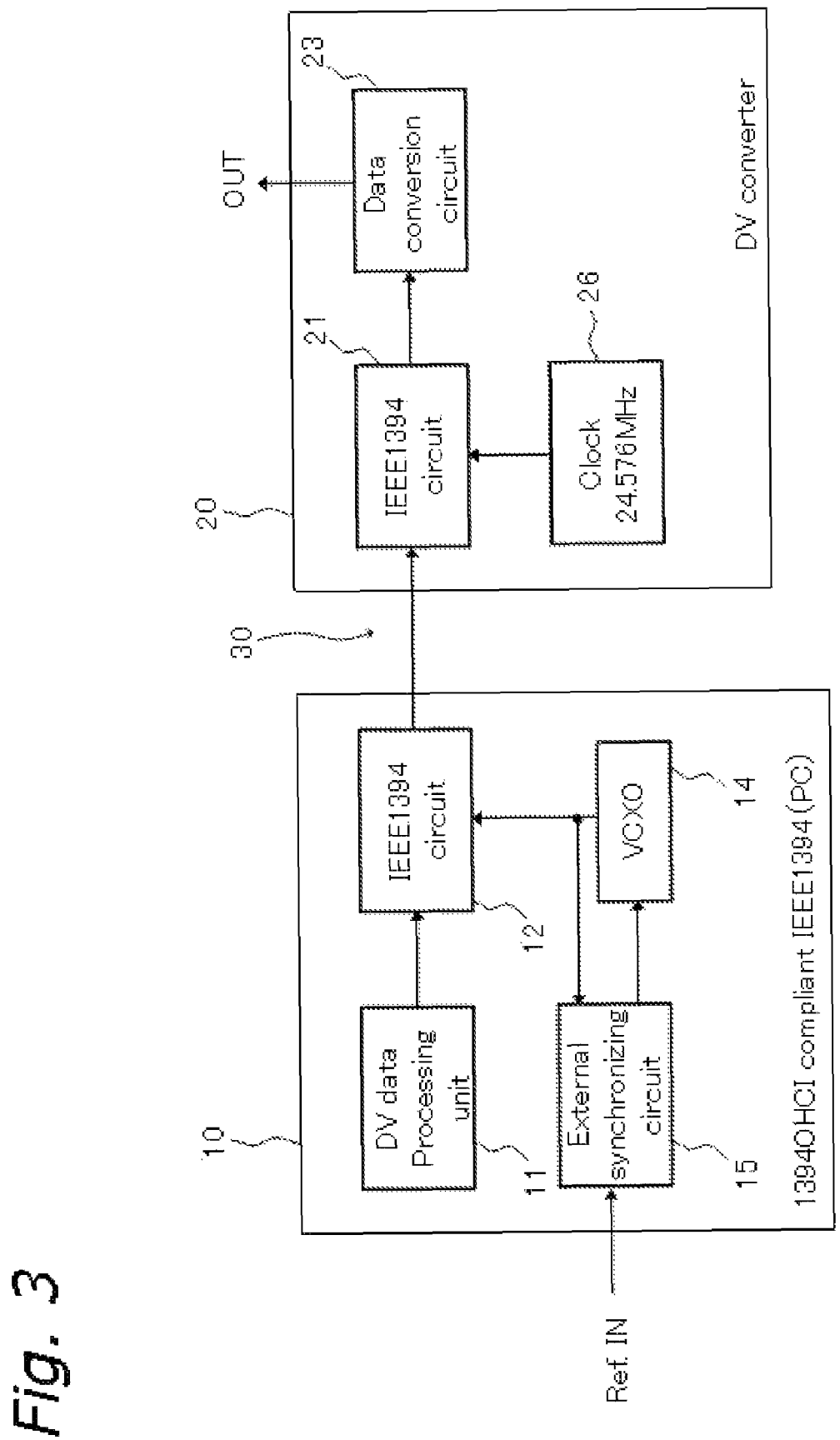
FIG. 3 is a simplified block diagram of the third embodiment.

In FIG. 3, the PC 10 serving as 1394OHCI compliant IEEE1394 hardware and the DV converter 20 for converting a video signal in DV format into an analog video signal or SDI video signal are connected by the IEEE1394 cable 30.

The PC 10 comprises the DV data processing unit 11 containing a hard disk or other recording medium for storing moving image data in DV format, the IEEE1394 circuit 12 for inputting/outputting data in an IEEE1394-defined packet format, the VCXO 14 subject to oscillation frequency control by voltage feedback, and an external synchronizing circuit 15 for receiving an external reference signal. As with the above, the PC 10 contains a CPU, ROM, RAM, and other interfaces, but these functional parts are omitted in the drawing. Further, the PC 10 environment allows execution of video editing software for editing at least data in DV format, and output is performed via the DV data processing unit 11 and IEEE1394 circuit 12.

The DV converter 20 comprises the IEEE1394 circuit 21 for receiving a video signal in DV format transferred via the IEEE1394 cable 30, the data conversion circuit 23 for converting the transferred video signal in DV format into an analog video signal or SDI video signal, and a clock source 26 constituted by a crystal oscillator or the like. This DV converter also comprises a CPU, ROM, RAM, and various interfaces, but these functional parts are omitted in the drawing.

With the third embodiment thus configured, in accordance with a reference signal received by the external synchronizing circuit 15 of the PC 10, the VCXO 14 in the PC 10 is subject to feedback control so as to maintain a constant timing differential between the reference signal and cycle start packet. As a result, the output interval between cycle start packets created by frequency division at a set rate of the VCXO 14 clock changes, and the transfer rate from the 1394OHCI compliant IEEE1394 PC 10 determined by the cycle start packet interval is synchronized with the reference signal. In this case, the IEEE1394 node that is the PC 10 needs to serve as a cycle master.

Thus, with the third embodiment, a data-converted analog video signal or SDI video signal is fully synchronized with the reference signal and output in a state with no defects such as dropped frames or repeated frames.

With the third embodiment, standard hardware can serve as the DV converter 20 without modification.

Thus, with the present invention, the frame frequency of data output in synchronism with a reference signal for external synchronization, and of data output via the 1394OHCI compliant IEEE1394 interface can be synchronized, preventing data defects caused by difference in frame frequencies such as dropped frames or repeated frames.

INDUSTRIAL APPLICABILITY

With the present invention, when a video signal in DV format is output from a PC and converted into an analog video signal or SDI video signal, the IEEE1394 transfer rate and output frame rate are synchronized, preventing the occurrence of image defects such as dropped frames or repeated frames. The data formats for conversion are not limited to those described in the embodiments, and application is possible to mutual conversion between video signals in such formats as analog video signal, SDI video signal, DV video signal, MPEG1, MPEG2, MPEG4, and others. Further, application of the present invention is not limited to moving image data, and application to audio data is also possible.

What is claimed is:

1. A video signal conversion system comprising:
    a first node and a second node in which one of the first node and the second node on an IEEE1394 bus serves as a cycle master,
    the first node having a DV data processing unit configured to transmit first a DV video signal to the second node via the IEEE1394 bus at a transfer rate synchronized with a cycle start packet output from the cycle master,
    the second node having a data conversion unit configured to receive the first DV video signal from the DV data processing unit of the first node via the IEEE1394 bus, convert the first DV video signal to a second video signal, and output the second video signal generated by conversion of the first DV video signal in the second node in synchronism with an external reference signal from the second node,
    an external synchronizing signal receiver for receiving the external reference signal provided on at least one of the first and second nodes, and
    a synchronization adjustment unit for synchronizing a frequency of the cycle start packet output from the cycle master with a frequency of the external reference signal received by the external synchronizing signal receiver, by carrying out feedback control of a clock source frequency of the cycle master using the external reference signal, such that the transfer of the first DV video signal to the second node is synchronized with the output of the second video signal from the second node.

2. The video signal data conversion system according to claim 1, wherein the second video signal is an analog video signal or SDI video signal.

3. The video signal conversion system according to claim 1, wherein the first node serves as the cycle master for data transfer.

4. The video signal conversion system according to claim 1, wherein
    the second node comprises a second synchronization adjustment unit,
    the frequency of the cycle start packet is linked with the frequency of the reference signal by the synchronization adjustment unit of the node that serves as the cycle master.

5. The video signal conversion system according to claim 1, wherein the first node is hardware comprising an 1394OHCI compliant IEEE1394 interface for outputting the DV video signal, and the second node is data conversion hardware for outputting an analog video signal or SDI video signal as the second video signal.

6. The video signal conversion system according to claim 1, wherein the second node comprises the external synchronizing signal receiver and synchronization adjustment unit, and serves as the cycle master.

7. The video signal conversion system according to claim 1, wherein the first node comprises the synchronization adjustment unit, the second node comprises the external synchronizing signal receiver and synchronization adjustment unit, and the cycle start packet frequency is synchronized with the frequency of the external reference signal received by the external synchronizing signal receiver by means of the synchronization adjustment unit of the node that serves as the cycle master.

8. The video signal conversion system according to claim 7, wherein when the first node serves as the cycle master, the external reference signal received by the external synchronizing signal receiver of the second node is transmitted from the second node to the first node by asynchronous transfer of an IEEE 1394 interface.

9. The video signal conversion system according to claim 7, comprising a dedicated synchronization signal line for transmitting the external reference signal received by the external synchronizing signal receiver of the second node from the second node to the first node when the first node serves as the cycle master.

10. The video signal conversion system according to claim 1, wherein the first node comprises the external synchronizing signal receiver and synchronization adjustment unit, and serves as the cycle master for data transfer.

11. The video signal conversion system according to claim 1, wherein one of the first node and the second node serves as the cycle master and the other of the first node and the second node includes the synchronization adjustment unit.

12. The video signal conversion system comprising:
a first node and a second node in which one of the first node and the second node on an IEEE1394 bus serves as a cycle master, the first node having a DV data processing unit configured to transmit a DV video signal the second node via the IEEE1394 bus at a transfer rate synchronized with a cycle start packet output from the cycle master, the second node having a data conversion unit configured to receive the DV video signal from the DV data processing unit of the first node via the IEEE1394 bus, convert the DV video signal to a second video signal, and output the second video signal generated by conversion of the DV video signal in the second node in synchronism with an external reference signal from the second node,
an external synchronizing signal receiver for receiving the external reference signal provided on at least one of the first and second nodes, and
a synchronization adjustment unit for synchronizing a frequency of the cycle start packet output from the cycle master with a frequency of the external reference signal received by the external synchronizing signal receiver, by carrying out feedback control of a clock source frequency of the cycle master using the external reference signal, such that the transfer of the first DV video signal to the second node is synchronized with the output of the second video signal from the second node,
wherein the second video signal is an analog video signal.

13. The video signal conversion system comprising:
a first node and a second node in which one of the first node and the second node on an IEEE1394 bus serves as a cycle master, the first node having a DV data processing unit configured to transmit a DV video signal to the second node via the IEEE1394 bus at a transfer rate synchronized with a cycle start packet output from the cycle master, the second node having a data conversion unit configured to receive the DV video signal from the DV data processing unit of the first node via the IEEE1394 bus, convert the DV video signal to a second video signal, and output the second video signal generated by conversion of the DV video signal in the second node in synchronism with an external reference signal provided on at least one of the first and second nodes,
an external synchronizing signal receiver for receiving the external reference signal provided on at least one of the first and second nodes, and
a synchronization adjustment unit for synchronizing a frequency of the cycle start packet output from the cycle master with a frequency of the external reference signal received by the external synchronizing signal receiver, by carrying out feedback control of a clock source frequency of the cycle master using the external reference signal, such that the transfer of the first DV video signal to the second node is synchronized with the output of the second video signal,
wherein the second digital video signal is a second video signal in SDI format,

* * * * *